Dec. 18, 1956     F. KESSELRING     2,774,931
ALTERNATING CURRENT SWITCHING DEVICE
Filed March 18, 1953
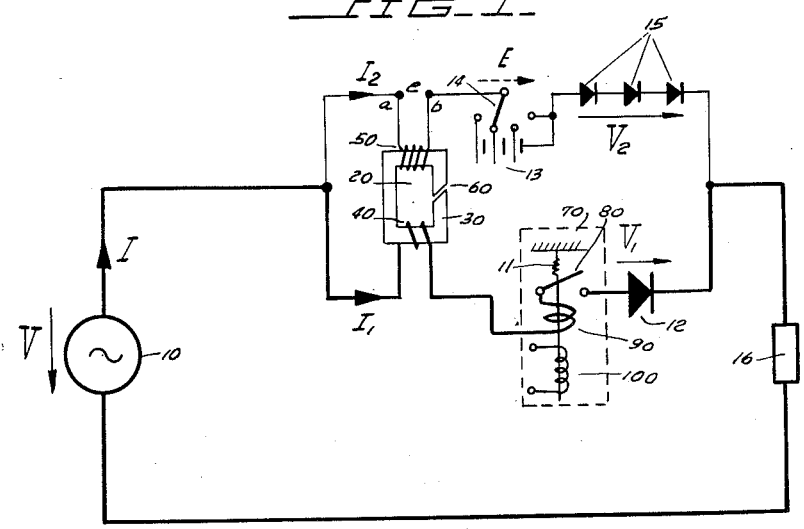
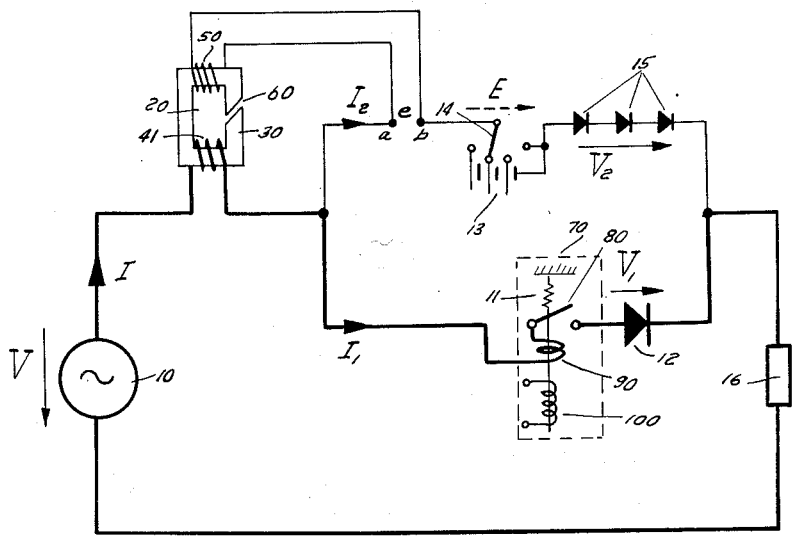
INVENTOR.
FRITZ KESSELRING
BY
ATTORNEYS 2,774,931
Patented Dec. 18, 1956

United States Patent Office

2,774,931

ALTERNATING CURRENT SWITCHING DEVICE

Fritz Kesselring, Zollikon Zurich, Switzerland, assignor to FKG Fritz Kesselring Geratebau A. G., Bachtobel-Weinfelden, Thurgau, Switzerland, a corporation of Switzerland Application March 18, 1953, Serial No. 343,078

Claims priority, application Switzerland March 22, 1952

11 Claims. (Cl. 321—27)

My invention relates to alternating current switching devices and is more particularly directed to an improvement over the arrangement shown in my copending application Serial No. 343,077 filed March 18, 1953.

My copending application discloses a switching arrangement wherein a substantially sparkless operation of the electromagnetic switching device is achieved without the use of a commutating or saturable reactor.

Basically, this system sets forth an arrangement wherein the load current is intermittently divided into parallel branch paths, hereinafter called a current path and a voltage path. In this arrangement, the current path contains the electromagnetic switching devices and a current rectifier, and the voltage path contains an inductor and a voltage rectifier.

The current rectifier is designed to withstand the full load current but is never called upon to withstand the back voltage or negative breakdown voltage of the source.

The voltage rectifier in the voltage branch need not carry the full load current but must be capable of withstanding the full back voltage. That is, it must have a high negative breakdown voltage.

The parallel paths are properly designed so that on the occurrence of current flow through the voltage path, there will be a phase difference between the currents of the alternate paths. The arrangement is such that the current in the current path will lead the current in the voltage path.

Also, the arrangement is properly designed so that only a fraction of the total load current is diverted to the voltage path. Thus, at a particular time within the operating cycle of the device, there will be current flow in both paths and when the current of the path reaches current zero value, the electromagnetic device will be opeartive to open under substantially sparkless conditions even though there is a small lagging current flowing through the voltage path.

Since the alternate voltage path is utilized for the sole purpose of coordinating with the current path during the switch open operation, it is desirable to control this voltage circuit so that it is rendered ineffective during a major portion of the conducting cycle.

That is, since the current is diverted through the relatively high impedance path of the voltage circuit for the sole purpose of protecting the cooperating contacts during the switch open operation, it is desirable to both keep the magnitude of this diverted current to a small value and also prevent the diversion of current to the voltage path until it is necessary to coordinate this circuit with the current path.

My present invention is directed to a novel means whereby the commencement of current flow and magnitude thereof in the voltage path can be precisely controlled so as to maintain the losses in the circuit at an absolute minimum and maintain maximum efficiency of the rectifier.

In this arrangement, additional means are provided to trigger the voltage circuit to thereby insure that there will be no current flow therein until the desired time within the operating cycle. That is, since current flow in the voltage circuit during the portion of the operation cycle when the load current is increasing would merely add to the losses and inefficiency of the device, it is desirable to have the control or trigger means which permits current to flow in the voltage circuit until after the load current starts to decrease and immediately prior to the current zero condition in the current path.

With my novel arrangement, magnetic means are used to couple the voltage and current paths to thereby induce an E. M. F. in the voltage circuit which will be indicative of the current conditions in the current path.

In addition to this magnetic coupling means, a voltage source is provided in the voltage path which is poled in an opposite direction to the voltage rectifiers. Thus, unless the voltage means is compensated, for example by the magnetic coupling means, there will be no current flow through the voltage path. Thus, the circuit is so designed that the E. M. F. induced in the voltage path to compensate or neutralize for the D. C. voltage source will occur shortly before the current-zero condition in the current path.

Thus, since the load current is partially diverted to the voltage path due to the compensation or neutralization of the auxiliary D. C. voltage source, the leading current in the current path will rapidly move toward current zero.

It will be noted that with my novel arrangement, a precise control can be had over the voltage path and hence, there will be no excess of current flow either in time or magnitude in the voltage path.

Thus, with this arrangement, the current carrying capacity of the voltage rectifier is considerably reduced.

Accordingly, with the imporvement of my present invention, the basic circuit of my novel current voltage parallel path arrangement set forth in the above identified copending application can be adapted to decrease the IR losses and increase the efficiency.

My novel device can be provided in a parallel path rectifier in either one or two ways. As above noted, the control of the compensating means in the voltage path can be taken from the current path of the rectifier. However, in a modification of my invention, it is possible to achieve the same desirable results of close control over the voltage circuit by having the compensating means function in response to the full load current rather than the curent flowing through the current path.

Accordingly, a primary object of my invention is to provide a parallel path rectifier unit in which a controlling device is inserted in the voltage path to restrict flow of current therethrough until a predetermined time within the conducting cycle.

Another object of my invention is to provide a novel improvement of a magnetic rectifier in which current in the voltage path is prevented from flowing until a predetermined time immediately prior to the current zero condition in the current path.

Still another object of my invention is to provide a novel improvement for a sparkless rectifier in which the current path is magnetically coupled to the voltage path in such a manner that compensating or neutralizing voltage will not exist in the latter path when the current in the current path is increasing in the positive direction.

A further object of my invention is to provide a biasing voltage supply in the voltage path of a magnetic rectifier which electrically cooperates with a controlling means in such a manner that current flow in the voltage path commences immediately following current decrease in a positive cycle of either the load current or the current flowing through the current path.

Still another object of my invention is to provide a biasing voltage source for the voltage path of a magnetic rectifier which can be rendered ineffective at a predetermined time within a conducting cycle of the unit.

A further object of my invention is to provide a parallel path rectifier in which means prevent current flow through the voltage rectifier until a predetermined time within a cycle.

These and other objects of my invention will be apparent from the description when taken in connection with the drawings in which:

Figure 1 is a circuit diagram of a parallel path magnetic rectifier showing my novel arrangement for controlling the conductivity of the voltage rectifiers. In this arrangement the compensating means which is used to neutralize the auxiliary D. C. voltage source is controlled by the current flow through the current path.

Figure 2 is a circuit diagram illustrating a second embodiment by which the principle of my invention can be applied to a parallel path rectifier. In this arrangement, the neutralizing or compensating device in the voltage circuit is controlled from the load current as distinguished from control of the current in the current path, as illustrated in Figure 1.

Referring now to Figure 1, the energy from the alternating current voltage source 10 is to be switched and rectified by means of the parallel path arrangement shown for use by the load 16. In this arrangement, the current path consisting of the electromagnetic switch 70 and the current rectifier 12 is shunted by the voltage path consisting of the voltage rectifier 15, the D. C. voltage source 13 and the secondary winding or inductor 5.

The novelty of the instant invention resides in the magnetic coupling control unit 20 which is used to trigger off the voltage circuit.

The operation of the parallel path arrangement without the compensating coupling means 20, is described in my copending application and is here only briefly described.

The closing coil 100 of the electromagnetic switch 70 is sufficiently energized (not shown) when the voltage of the auxiliary source 10 passes through zero in a positive direction. This closes the cooperating contacts 80 against the opening force of the biasing spring 11 to thereby complete the current path.

Immediately prior to the closing operation of the electromagnetic switch 70, there is no current flow in the current path due to the fact that the electromagnetic contacts 80 are open and no current flow in the voltage path due to the fact that the voltage rectifiers 15 are poled in a direction to oppose current flow. That is, the voltage rectifiers 15 are properly constructed so that they have a high negative breakdown voltage and will not permit curve flow in the reverse direction.

However, immediately following the closing of the cooperating contacts 80 due to the energization of the closing coil 100 when the voltage of the alternating current source 10 passes through zero in a positive direction, current $I_1$ will commence to flow in a current path. Hence, the holding coil 90 will be energized and hold the cooperating contacts 80 in high pressure engagement.

During the initial period, when the load current is increasing in the positive direction, no current will flow in the voltage path for reasons hereinafter more fully described. However, immediately prior to the current zero conditions in a current path, current will commence to flow through the voltage path.

The circuitry is so arranged that the current in this voltage path will lag the current in the current path and hence, when current zero conditions exist in the current path, current will continue to flow in the voltage path.

It will be noted that the energization of the closing coil 100 is caused by current which is rectified and leads the load current and hence, at the time of current zero conditions in the current path, the closing coil 100 will be de-energized.

Thus, when the holding coil 90 is de-energized due to the above mentioned current zero conditions, the cooperating contacts 80 will open under the force of the biasing spring 11. This interruption occurs under sparkless conditions due to the fact that the current is at zero magnitude.

Immediately following the separation of the contacts the current $I_2$ in the voltage path will also pass through zero and due to the fact that the voltage rectifiers 15 are poled to oppose the negative voltage of the A. C. source 10, current will also cease to flow in the current path and complete interruption will thereby be achieved until the next positive voltage cycle.

In the novel improvement set forth in Figure 1, an auxiliary D. C. source 13 is provided in the voltage path so as to apply a negative potential to the voltage rectifiers 15. That is, the voltage is applied to these rectifiers in a reverse direction so that current can not flow through the rectifiers due to the negative biasing of source 13.

The voltage source 13 having a voltage designated by the letter E is in series with the secondary winding 50 of the transformer 20.

The primary winding 40 is connected in series with the electromagnetic switch 70 and the current rectifier 12.

Thus, with this arrangement, the current path is magnetically coupled to the voltage path through the magnetic core 30. The magnetic core 30 is provided with an opening 60 to prevent losses from occurring within the core in a manner well known in the art.

During the positive increase of the current $I_1$, a voltage $e$ will be induced in the secondary winding 50, the polarity of which will be in the same direction as the auxiliary D. C. source 14.

Accordingly, during the increase in the positive half cycle, a large negative back voltage will occur across the voltage rectifiers 15 due to the addition of the secondary voltage $e$ and the D. C. battery E.

Thus, during this period of time, no current will flow through the voltage path. However, after the current passes through the maximum of the positive half cycle and commences to decrease while in the positive half cycle, a voltage $e$ will be induced in the secondary winding 50 which will be of a polarity opposite to that of the auxiliary D. C. source 13.

Hence, during this period of time, the auxiliary source 13 will be compensated or neutralized so that the net voltage effect on the voltage rectifiers 15 due to the induced voltage in the secondary 50 and the D. C. source 13 will be substantially zero.

Since the remaining voltage in this circuit, due to the voltage source 10 or the voltage drop in the current path caused by $I_1$ will be of a proper polarity to permit forward current flow through the voltage rectifiers 15, current will commence to flow therethrough.

Due to the inductance in the voltage path caused by the secondary winding 50, the current therein will lag the current $I_1$ of the current path and hence, substantially sparkless interruption can be achieved by the electromagnetic switch as above described and fully set fourth in the heretofore mentioned copending application.

As already noted, the voltage path is provided for the sole purpose of achieving substantially currentless interruption in the current path and hence, the current flow in the first mentioned path need not exist during the entire conducting cycle of the rectifier. In fact, it is desirable to insure that current flow therein is maintained at a zero value until immediately prior to the current zero conditions in the current path.

Thus, with my novel compensating or neutralizing arrangement, the circuitry can be properly designed and adjusted so that the voltage circuit is triggered off at precisely the desired time within the conducting cycle.

To this end, I provide an adjustment means 14 for the D. C. source 13 so that the effective voltage thereof can be adjusted. The adjustment means 14 can take the form of a tap changing means or any other desirable voltage controlling means known in the art. Hence, with this adjustment arrangement, the circuitry can be properly calibrated so that the neutralizing or compensating effect of the induced voltage *e* from the secondary winding 50 on the voltage E of the D. C. source 13 will be effective immediately prior to the current zero conditions in the current path.

Thus, I have provided a novel improvement for a parallel path magnetic rectifying means wherein precise control over the voltage circuit can be achieved to limit both the magnitude and period of flow of the current in the voltage path.

In a modified arrangement of my invention, the compensating means of transformer 20 can be energized from the load current I instead of from the current path current $I_1$. This arrangement is shown in Figure 2 wherein similar components to those used in Figure 1 are designated by the same numerals.

The arrangement shown in Figure 2 is desirable when it is necessary to induce a high E. M. F. *e* in the secondary winding 50. That is, if it is desired to have a large D. C. source 13 for negative biasing effect on the negative voltage bias 16, it will be necessary to induce a larger E. M. F. in the secondary winding 50. Hence, the arrangement of Figure 2 will enable the designer to obtain the larger induced E. M. F.

It will be noted that the circuitry shown in Figures 1 and 2 represents a preferred embodiment of my invention. However, to one skilled in the art, the arrangement can be readily and easily modified so as to incorporate the novel device shown in my copending application. Thus, for example, the voltage rectifiers 15 may be replaced by a gas diode or triode, as therein described.

Accordingly, I have described a novel improvement for a parallel path rectifier in which a biasing means is provided for the voltage rectifiers so that same will be rendered ineffective during the positive increasing quarter cycle of the load current, and have provided compensating or neutralizing means to render the biasing effect of the auxiliary source ineffective at some predetermined time in the decreasing positive half cycle of the load current.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a parallel path magnetic rectifier comprising a first and a current path; a diode in said current path; a compensating means; said compensating means magnetically coupling said first path to said current path; electrical biasing means for said first path; said compensating means neutralizing the effect of said biasing means at a predetermined time within the conducting cycle of said rectifier; said compensating means being a transformer; said electrically biasing means being a D. C. source.

2. In a parallel path magnetic rectifier comprising a first and a current path; a diode in said current path; a compensating means; said compensating means magnetically coupling said first path to said current path; electrical biasing means for said first path; said compensating means neutralizing the effect of said biasing means at a predetermined time within the conducting cycle of said rectifier; said compensating means being a transformer having a primary and a secondary winding; said primary winding in series with said current path; said secondary winding in series with said first path.

3. In a parallel path magnetic rectifier comprising a first and a current path; a diode in said current path; a compensating means; said compensating means magnetically coupling said first path to said current path; electrical biasing means for said first path; said compensating means neutralizing the effect of said biasing means at a predetermined time within the conducting cycle of said rectifier; said compensating means being a transformer having a primary and secondary winding; said primary winding energized from the full load current rectified by said magnetic rectifier; said secondary winding connected in series with said electrical biasing means.

4. In a parallel path magnetic rectifier comprising a first and a current path; a diode in said current path; a compensating means; said compensating means magnetically coupling said voltage path to said current path; electrical biasing means for said first path; said compensating means neutralizing the effect of said biasing means at a predetermined time within the conducting cycle of said rectifier; a first rectifier in said first path; said electrical biasing means being a D. C. voltage source; said D. C. first source and said first rectifier being connected in series.

5. In a parallel path magnetic rectifier comprising a first and a current path; a diode in said current path; a compensating means; said compensating means magnetically coupling said first path to said current path; electrical biasing means for said first path; said compensating means neutralizing the effect of said biasing means at a predetermined time within the conducting cycle of said rectifier; a first rectifier in said first path; said electrical biasing means being a D. C. voltage source; said D. C. voltage source and said first rectifier being connected in series; said compensating means being a transformer having a primary and a secondary winding; said secondary winding connected in series with said D. C. voltage source and said first rectifier; said primary winding of said transformer energized by the rectified current of said magnetic rectifier.

6. In a magnetic rectifier comprising a first path and a current path; a diode in said current path; said first path comprising a secondary winding, a D. C. voltage source and a first rectifier; said current path comprising a primary winding; an electromagnetic switch and a current rectifier; said first path connected in parallel with said current path; said D. C. voltage source applying a negative potential to said voltage rectifier; a magnetic core coupling said primary winding to said secondary winding; said primary winding inducing an E. M. F. in said secondary winding during the positive increase of current there-through of a polarity in the same direction as said D. C. voltage source.

7. In a magnetic rectifier comprising a first path and a current path; a diode in said current path; said first path comprising a secondary winding, a D. C. voltage source and a first rectifier; said current path comprising a primary winding; an electromagnetic switch and a current rectifier; said first path connected in parallel with said current path; said D. C. voltage source applying a negative potential to said voltage rectifier; a magnetic core coupling said primary winding to said secondary winding; said primary winding inducing an E. M. F. in said secondary winding of opposite polarity to said D. C. voltage source when said primary winding is energized by a positive decrease in current.

8. In a magnetic rectifier comprising a first path and a current path; a diode in said current path; said first path comprising a secondary winding, a D. C. voltage source and a first rectifier; said current path comprising a primary winding; an electromagnetic switch and a current rectifier; said first path connected in parallel with said current path; said D. C. voltage source applying a negative potential to said first rectifier; a magnetic core coupling said primary winding to said secondary winding; said primary winding inducing an E. M. F. in said secondary winding during the positive increase of current therethrough of a polarity in the same direction as said D. C. voltage source; said primary winding inducing an E. M. F. in said secondary winding of opposite polarity to said D. C. voltage source when said primary winding is energized by a positive decrease in current.

9. An electromagnetic rectifier for rectifying the A. C. energy from a voltage source to a load comprising a current path and a first path connected in parallel; a diode in said current path; said current path magnetically coupled to said first path by means of a transformer; said transformer having a primary and a secondary winding; said primary winding of said transformer energized from the rectified current of said electromagnetic rectifier; said secondary winding of said transformer connected in series with said first path; said primary winding inducing a voltage in said secondary winding during the increased positive cycle of the rectifier current to maintain said first path ineffective.

10. An electromagnetic rectifier for rectifying the A. C. energy from a voltage source to a load comprising a current path and a first path connected in parallel; a diode in said current path; said current path magnetically coupled to said first path by means of a transformer; said transformer having a primary and a secondary winding; said primary winding of said transformer energized from the rectified current of said electromagnetic rectifier; said secondary winding of said transformer connected in series with said first path; said primary winding inducing an E. M. F. in said secondary winding to render said first path effective only during the decreasing positive half cycle of the rectifier current.

11. An electromagnetic rectifier for rectifying the A. C. energy from a voltage source to a load comprising a current path and a first path connected in parallel; a diode in said current path; said current path magnetically coupled to said first path by means of a transformer; said transformer having a primary and a secondary winding; said primary winding of said transformer energized from the rectified current of said electromagnetic rectifier; said secondary winding of said transformer connected in series with said first path; said primary winding inducing a voltage in said secondary winding during the increased positive cycle of the rectifier current to maintain said first path ineffective; said primary winding inducing the E. M. F. in said secondary winding to render said voltage path effective only during the decreasing positive half cycle of the rectifier current.

References Cited in the file of this patent

UNITED STATES PATENTS

| | | |
|---|---|---|
| 2,610,231 | Wettstein | Sept. 9, 1952 |
| 2,619,628 | Kesselring | Nov. 25, 1952 |

FOREIGN PATENTS

| | | |
|---|---|---|
| 875,695 | France | Sept. 30, 1942 |